| United States Patent [19] | [11] 3,894,028 |
|---|---|
| Levy | [45] July 8, 1975 |

[54] PROCESS FOR THE PREPARATION OF OPTICAL ANTIPODE OF VINCAMINE AND NEW INDOLE DERIVATIVES

[75] Inventor: Jean Levy, Reims, France

[73] Assignee: Omnium Chimique Societe Anonyme, Brussels, Belgium

[22] Filed: Apr. 10, 1972

[21] Appl. No.: 242,743

[30] Foreign Application Priority Data
Apr. 15, 1971   Belgium .............................. 765795

[52] U.S. Cl. ......................... 260/287 R; 260/287 A
[51] Int. Cl. ............................................ C07d 33/48
[58] Field of Search ................................ 260/287 R

[56] References Cited
OTHER PUBLICATIONS
James P. Kutney et al., JACS, Apr. 7, 1969, p. 1703.

*Primary Examiner*—Donald G. Daus
*Assistant Examiner*—D. Wheeler
*Attorney, Agent, or Firm*—Pollock, Philpitt & Vande Sande

[57] ABSTRACT

A process is described for the preparation of the optical antipode of vincamine from (+)-vincadifformine. The process comprises (i) oxidation with a per-compound to form (+)-N-oxy-vincadifformine, (ii) oxidation of the latter with a per-compound to form (+)-1,2-dehydro-16-carbomethoxy-16-hydroxy-N-oxy-aspidospermidine, and (iii) reducing the latter with a reducing agent for the N-oxy group in acidic medium, whereby reduction and rearrangement simultaneously occur to give a mixture of the optical antipodes of vincamine, 16-epi-vincamine, and apo-vincamine, which can be separated into its constituents.

The products of steps (i) and (ii) are novel and other analogous novel compounds are obtained by reactions with (+)-vincadifformine, which analogous compounds can also be rearranged in acidic medium to form a mixture of the optical antipodes of vincamine, 16-epi-vincamine and apo-vincamine.

17 Claims, No Drawings

PROCESS FOR THE PREPARATION OF OPTICAL ANTIPODE OF VINCAMINE AND NEW INDOLE DERIVATIVES

The present invention is concerned with a process for the preparation of the antipode of natural vincamine and, more particularly, with a multi-stage process in which novel indole derivatives are obtained as intermediates in the synthesis of the antipodes of vincamine, 16-epi-vincamine and apo-vincamine of the natural series.

In particular, the present invention is concerned with two processes for preparing the optical antipodes of vincamine and, secondarily, of 16-epi-vincamine and of apo-vincamine, in good yields from (+)-vincadifformine. The latter is a natural substance which can be obtained by the extraction of *Amsonia tabernaemontana* (Apocynaceae).

According to the first process, (+)-vincadifformine (I) is treated with an equimolar quantity of a peroxide to convert it into (+)-N-oxy-vincadifformine (II):

(+)-N-oxy-vincadifformine (II) is then treated with an equimolar quantity of the same or a different peroxide in order to obtain (+)-1,2-dehydro-16-carbomethoxy-16-hydroxy-N-oxy-aspidospermidine (III):

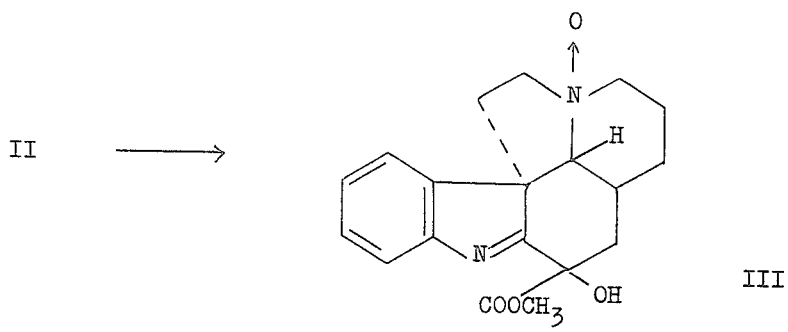

The product III is then treated in an acidic medium with a reducing agent capable of reducing the N-oxide group, such as an equimolar quantity of triphenylphosphine. Reduction is accompanied by rearrangement which leads to the formation of a mixture of the optical antipodes of vincamine (IV), 16-epi-vincamine (V) and apo-vincamine (VI):

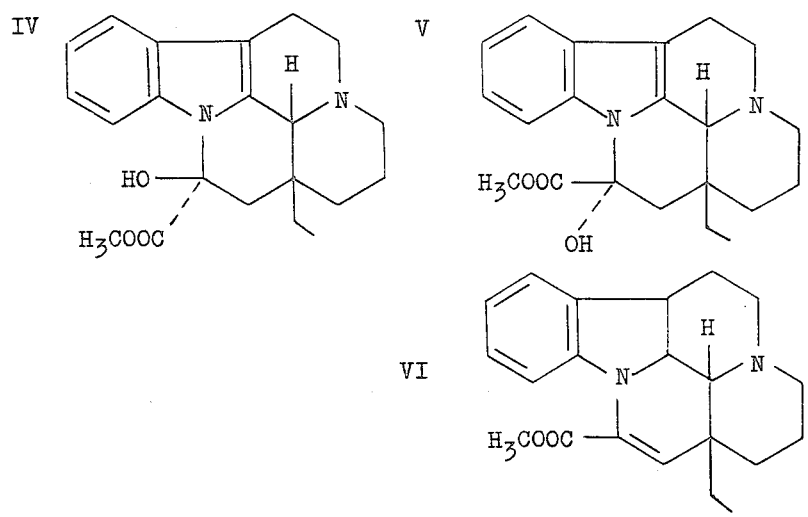

The mixture thus obtained can be separated by chromatography into two fractions. The more polar fraction consists, as to a major proportion, of the optical antipode of vincamine and, as to a minor proportion, of the optical antipode of 16-epi-vincamine and these compounds can be separated by crystallisation. The less polar fraction gives the optical antipode of apo-vincamine on crystallisation.

According to a first variant of this process, (+)-1,2-

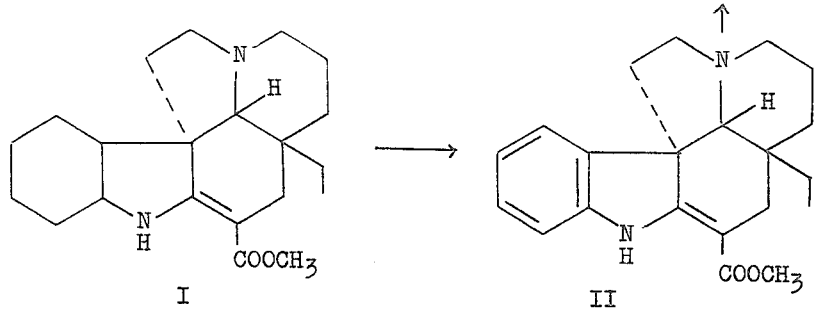

dehydro-16-carbomethoxy-16-hydroxy-N-oxy-aspidospermidine (III) is obtained directly without isolating (+)-N-oxy-vincadifformine (II), by treating (+)-vincadifformine (I) with approximately two molar equivalents of peroxide for a sufficient period.

According to a second variant of the process, the fractionation of the mixture of IV, V and VI is effected by a plurality of successive crystallisation without having recourse to chromatography.

Preferred procedures and reactants for carrying out the various stages of this process will now be described by way of example in greater detail.

In the first stage, (+)-vincadifformine is preferably treated for 1 to 5 hours with an equimolar quantity of a peracid at room temperature under nitrogen and in the absence of light, in a water-immiscible organic solvent which may, for example, be an aromatic solvent, such as benzene or toluene, an ether, or a chlorinated aliphatic hydrocarbon, such as methylene chloride, carbon tetrachloride, chloroform, trichloroethylene or tetrachloroethane.

The organic reaction solution is washed with an aqueous alkaline solution to remove the major part of the peroxy compound and its conversion products, and is then distilled to give a residue consisting of (+)-N-oxy-vincadifformine (II) which is obtained in a yield of about 90 percent. The latter can be converted as such into III or can first be purified by crystallisation in a mixture of light solvents.

The compound II is novel and has the following characteristics:

m.p. 160°C (decomp.)
$[\alpha]_D$+213° (c=1, methanol)
U.V. (methanol) max at $\lambda$ log $\epsilon$:228 (3.99), 297 (3.99) and 331 (4.11) nm.
I.R. conjugated ester bands at 1670 and 1610 cm$^{-1}$ Mass spectrum, $M_1$ molecular peak at m/e=354

Analysis: calculated for
$C_{21}H_{26}O_3N_2$: C, 71.16%   H, 7.39%
found: C, 71.0%   H, 7.4%

In the second stage, (+)-N-oxy-vincadifformine (II) is preferably treated with an equimolar quantity of a peracid as in the first stage, but for 1 to 5 days in order to obtain (+)-1,2-dehydro-16-carbomethoxy-16-hydroxy-N-oxy-aspidospermidine (III) in a yield of about 80 percent. The latter can be purified by crystallisation in a light solvent or used as such in the next stage of the process.

The compound III is novel and has the following characteristics:

m.p. 178°-180°C (decomp.)
$[\alpha]_D$=107° ( c=1, methanol)
U.V. (methanol) max at $\lambda$ log $\epsilon$:223 (4.29), 270 (3.73) nm
I.R. non-conjugated ester carbonyl at 1738 cm$^{-1}$
Mass spectrum, $M_1$ molecular peak at m/e=370

Analysis: calculated for
$C_{21}H_{26}O_4N_2$: C, 68.09%   H, 7.07%
found: C, 68.0%   H, 7.1%

The peracids used in the first and second stages may be the same or different. Suitable peracids are, for example, peracetic acid, perbenzoic acid, m-chloroperbenzoic acid, p-nitroperbenzoic acid, trifluoroperacetic acid, performic acid, and perphthalic acid.

It is not necessary to isolate the intermediate II, but if this is not done, the (+)-vincadifformine I must be treated with a double molar quantity of peracid under the conditions described above for 1 to 5 days. The product III is then obtained in a yield of about 85 percent.

In the third stage, the intermediate III is preferably reacted with an equimolar quantity of triphenylphosphine, as the N-oxide group reducing agent, in solution in a liquid organic acid of low molecular weight, preferably acetic acid.

After boiling for 1 to 2 hours under nitrogen, the solution is cooled, diluted with equal quantity of water, and washed with a double quantity of benzene or ether in order to remove the triphenylphosphine oxide formed. The light organic phase formed is removed by decantation and the acidic aqueous phase is rendered alkaline to pH 10 and extracted with an organic solvent, such as methylene chloride, chloroform, ether or benzene.

The organic phase is decanted, washed with pure water, dried over a dehydrating agent, such as sodium sulphate, and finally freed of the solvent by distillation.

The residue thus obtained in a yield of about 85 percent, consists of a mixture of the optical antipodes of vincamine (IV), 16-epi-vincamine (V), and apo-vincamine (VI).

In order to obtain each of these products, the m/e residue obtained from the preceding stage is preferably dissolved in 10 parts of benzene and chromatographed on a column of 30 parts of alumina. Elution is successively carried out with benzene, an 80/20 mixture of benzene and ether, and pure ether. By crystallisation in acetone, each of these fractions gives, respectively, the optical antipode of apo-vincamine (VI), of vincamine (IV), and of 16-epi-vincamine (V), in the approximate relative proportions of 25 percent, 50 percent and 25 percent.

If the last stage of the process is carried out in the cold for 12 hours in 90 percent aqueous acetic acid, for example, in place of 1 to 2 hours of boiling as described above, the crude reaction product, which is obtained in a yield of about 85 percent, contains very little of the optical antipode of apo-vincamine (VI) and consists essentially of the optical antipodes of vincamine (IV) and of 16-epi-vincamine (V) in the respective proportions of 3 parts to 1 part. The optical antipode of vincamine can be isolated from this mixture by two crystallisation in, for example, acetone, methanol, ethanol or propanol.

The characteristics of the optical antipodes are as follows:

Vincamine: m.p. 232°C
$[\alpha]_D$ = −42° (c = 1, pyridine)
Analysis: calculated for
$C_{21}H_{26}O_3N_2$: C,71.16% H,7.39% N,7.90%
found: C,71.49% H,7.52% N,7.79%
16-Epi-vincamine:
m.p. 181–185°C
$[\alpha]_D$ = +36° (c = 1, chloroform)
Analysis: calculated for
$C_{21}H_{26}O_3N_2$: C,71.16% H,7.39% N,7.90%
found: C,71.18% H,7.43% N,7.82%
Apo-vincamine:
m.p. 161°C
$[\alpha]_D$ = −202° (c = 0.5, pyridine)
Analysis: calculated for
$C_{21}H_{24}O_2N_2$: C,75.10% H,7.17% N,8.33%
found: C,74.78% H,7.56% N,8.36%

In order that the invention may be more fully understood, the following examples are given by way of illustration only:

EXAMPLE 1

(+)-N-oxy-vincadifformine

A solution of 1.300 kg of (+)-vincadifformine and 800 g of p-nitroperbenzoic acid in 200 l of dry benzene was allowed to stand, under nitrogen and in the absence of light. After 4 hours under these conditions, a control experiment previously carried out by chromatography on a thin layer silica gel plate (eluant : 50 percent benzene, 39 percent methanol, 10 percent ether, and 1 percent ammonia), showed the total disappearance of the original blue spot given by (+)-vincadifformine with ammoniacal ceric sulphate reagent and its replacement by another blue spot having a lower Rf. At the end of this time, therefore, the benzene solution was washed with an aqueous solution of sodium bicarbonate and with water. After drying the benzene solution and then distilling off the solvent, a thick oil weighing 1.380 kg was obtained (yield: 90 percent) which gave, after crystallisation in a methylene chloride-ether mixture, (+)-N-oxy-vincadifformine (II), m.p. 160°C.

EXAMPLE 2

(+)-1,2-Dehydro-16-carbomethoxy-16-hydroxy-N-oxy-aspidospermidine (III)

A solution of 1.410 kg of (+)-N-oxy-vincadifformine (II) and 800 g of p-nitroperbenzoic acid in 200l of dry benzene was allowed to stand under nitrogen in the absence of light. After 4 hours under these conditions, a control experiment previously carried out by chromatography on a thin layer plate showed the total disappearance of the original blue spot given by (+)-N-oxy-vincadifformine with ammoniacal ceric sulphate reagent and its replacement by a product which was not revealed with this reagent but which gave a brown spot with Dragendorff reagent. At the end of this time, therefore, the reaction solution was treated as in the preceding example. A thick oil weighing 1.320 kg (yield: 89 percent) was obtained which, on crystallisation in a methylene chloride-ether mixture, gave the compound III in crystalline form, m.p. 178°–180°C (decomp.).

EXAMPLE 3

(+)-1,2-Dehydro-16-carbomethoxy-16-hydroxy-N-oxy-aspidospermidine III

A solution of 1.360 kg of (+)-vincadifformine (I) and 1.600 kg of p-nitroperbenzoic acid in 200 l of dry benzene was allowed to stand for 5 days under nitrogen in the absence of light. At this stage a control experiment by chromatography on a thin layer plate showed the disappearance of the starting material I and the intermediate II and their replacement by the desired product III. Working up of the reaction solution as in the preceding examples, led to the isolation of 1.250 kg of the product III, yield: 84 percent.

The same reaction carried out in dry methylene chloride in place of benzene, gave the product III in a yield of 80 percent.

EXAMPLE 4

Optical antipodes of vincamine (IV), 16-epi-vincamine (V), and apo-vincamine (VI)

A solution of 1.110 kg of compound III and 780 g of triphenylphosphine in 100 l of pure acetic acid was heated to reflux for 2 hours. The reaction solution was diluted with an equal volume of iced water and washed with 50 l of benzene which removed 820 g of triphenylphosphine oxide. The reaction solution was then rendered alkaline with sodium bicarbonate and extracted twice with 50 l of methylene chloride. The combined methylene chloride extracts were washed with water and dried, and the solvent was distilled off to leave an oily residue weighing 950 g (yield: 86 percent).

Chromatographic analysis on a thin layer plate showed, with Dragendorff reagent, the presence of three constituents in this oily residue; the optical antipodes of apo-vincamine, of vincamine, and of 16-epi-vincamine in order of decreasing Rf values.

The oily residue, dissolved in 10 l of benzene, was chromatographed on a column of 30 kg of alumina. By successive elutions with benzene, an 80/20 mixture of benzene and ether, and ether alone, three fractions were obtained which on crystallisation in acetone gave three pure products which were identified by their physical constants (m.p., [α]$_D$, U.V., I.R., mass spectrum) as being, respectively, the optical antipodes of apo-vincamine (VI), 120 g, of vincamine (IV), 330 g, and of 16-epi-vincamine (V), 150 g.

The same reaction of III and triphenylphosphine carried out in acetic acid in the same proportions, but at room temperature for 12 hours, gave a yield of 85 percent of a crude mixture containing only traces of the optical antipode of apo-vincamine and consisting essentially of the optical antipodes of vincamine (IV), 3 parts, and of 16-epi-vincamine (V), 1 part.

The second process according to the invention is concerned with the preparation of other oxidation derivatives of (+)-vincadifformine, that is compounds of the formulae VIIa, VIIb, VIIc and VIId:

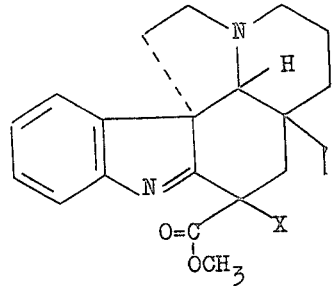

for
VIIa, X=OH
VIIb, X=OR
VIIc, X=OOC-R'
VIId, X=a halogen atom
where R and R' are an alkyl or aryl group, which compounds VIIa to VIId can also be rearranged in acidic medium to form the compounds IV, V and VI. The compounds VIIa–VIId are novel.

More particularly the compounds of formula VII may be prepared from (+)-vincadifformine as follows: the compound VIIa is obtained by the action of oxygen in the presence of a catalyst such as $PtO_2$; the compounds VIIb are obtained by the action of an alkyl or aryl peroxide; the compounds VIIc are obtained by the action of a salt of a heavy metal in a high degree of oxidation, the salt having the desired acyloxy group OOCR' as its anion, such as, for example, lead tetraacetate; and the compounds VIId are obtained by the action of an anion comprising the desired halogen and oxygen, this anion being present in an inorganic or organic compound, such for example as tert.butyl hypochlorite.

Interconversions can be carried out between the various compounds VIIa, VIIb, VIIc, and VIId, and the compound III: the selective reduction of the N-oxy group of compound III gives compound VIIa; the controlled hydrolysis of compounds VIId with a heavy metal salt having the desired acyloxy group as its anion gives compounds VIIc.

In a second stage, the compounds VII described above are rearranged in acidic medium to give a mixture of compounds IV, V and VI.

In order that this second aspect of the invention may be more fully understood, the following examples are given by way of illustration only:

EXAMPLE 5

(+)-1,2-Dehydro-16-carbomethoxy-16-acetoxyaspidospermidine, (VIIc, R'=CH$_3$)

A solution of 0.494 g (1.1 millimole) of lead tetraacetate in 10 ml of anhydrous methylene chloride was added rapidly and under nitrogen to a solution of 0.68 g (2 millimoles) of (+)-vincadifformine in 50 ml of anhydrous methylene chloride and the mixture was agitated and maintained at a temperature of from −10° to +5°C. Agitation was continued until a sample of the reaction mixture no longer immediately turned moist iodine starch paper blue. At this point, the precipitate which formed, was removed by filtration. The filtrate was washed with water, dried over magnesium, sulphate, and evaporated to dryness to give 0.46 g of residue. The latter was crystallised in ethyl acetate to give 0.28 g (yield: 57 percent) of (+)-1,2-dehydro-16-carbomethoxy-16-acetoxy-aspidospermidine.

m.p. 175°-180°C (decomp.)

λ max 225 and 275 nm, I.R. spectrum, C=O bands at 1750 and 1260 cm$^{-1}$, mass spectrum, calculated for C$_{23}$H$_{28}$O$_4$N$_2$, 396 found M$_f$=396

Analysis: calculated for
C$_{23}$H$_{28}$O$_4$N$_2$: C, 69.67%   H, 7.12 %
found: C, 69.60%   H, 7.00%

EXAMPLE 6

(+)-1,2-Dehydro-16-carbomethoxy-16-chloro-aspidospermidine (VIId, X=Cl)

A solution of 1.0 g of (+)-vincadifformine in 29 ml of methylene chloride containing 0.45 ml of freshly distilled triethylamine, was agitated at −16°C; 9 ml of a 6 percent (w/v) solution of tert.butyl hypochlorite in methylene chloride was then added drop by drop to the agitated solution over a period of 15 minutes. Agitation was continued for 30 minutes at the same temperature and 200 ml of iced water was added. The methylene chloride was separated by decantation and the aqueous phase was extracted twice with 150 ml of methylene chloride. The combined organic phases were washed, dried and evaporated to dryness under reduced pressure.

The residue, weighing 1.093 g, was chromatographed on silica. The least polar fraction gave 761 ml (crude yield; 69 percent) of a colourless lacquer which, on crystallation in ether, gave 571 mg of crystalline (+)-1,-2-dehydro-16-carbomethoxy-16-chloro-aspidospermidine.

m.p. 133°C $[\alpha]_D^{27°} = +254°$ (c=1.545 g percent, CHCl$_3$)

U.V. spectrum: λ max (log ε), 229 (4.38), 285 (3.89) nm

I.R. spectrum: bands at 1740 cm$^{-1}$ (solution in CHCl$_3$), 1730 and 1755 cm$^{-1}$ (KBr disc)

Mass spectrum: M$^+$ calculated for C$_{21}$H$_{25}$O$_2$N$_2$Cl = 372, 374
found = 372, 374

| Analysis: calculated for | C% | H% | O% | N% | Cl% |
|---|---|---|---|---|---|
| C$_{21}$H$_{25}$O$_2$N$_2$Cl: | 67.98 | 6.29 | 8.6 | 7.52 | 9.55 |
| found: | 67.8 | 6.2 | 8.5 | 7.7 | 9.8 |

EXAMPLE 7

(+)-1,2-Dehydro-16-carbomethoxy-16-acetoxy-aspidospermidine (VIIc, R'=CH$_3$)

1 g of finely divided silver acetate was added to a solution of 200 mg of 1,2-dehydro-16-carbomethoxy-16-chloro-aspidospermidine (VIId, X=Cl) in 50 ml of methylene chloride and the mixture was vigorously agitated at a temperature of less than 10°C under nitrogen for 36 hours. The suspended solid was then filtered off and the filtrate was washed with water, dried over magnesium sulphate and evaporated to dryness to give a residue (185 mg) which was chromatographed on silica to give a fraction which, after crystallisation in ethyl acetate, gave 27 mg of a product which was in all points identical with 1,2-dehydro-16-carbomethoxy-16-acetoxy-aspidospermidine as described in Example 5.

EXAMPLE 8

Optical antipodes of vincamine (IV), 16-epi-vincamine (V), and apo-vincamine (VI)

1 ml of trifluoroacetic acid was added to a solution of 2 g of (+)-1,2-dehydro-16-carbomethoxy-16-acetoxy-aspidospermidine in 60 ml of water-saturated methylene chloride and the mixture was maintained at 20°C for 6 days. Iced water was then added to the mixture and it was rendered alkaline with sodium carbonate, and the methylene chloride phase was separated. The aqueous phase was extracted twice with 30 ml of methylene chloride, the combined organic phases were washed with water, dried over magnesium sulphate, and evaporated to dryness to give an oily residue weighing 1.75 g. This residue was worked up as described in Example 4 to give three pure products identified by their physical constants (m.p., $[\alpha]_D$, U.V., I.R., mass spectrum) as the optical antipodes of apo-vincamine (VI), 0.32 g, of vincamine (IV), 0.58 g, and of 16-epi-vincamine (V), 0.27 g.

What is claimed is:

1. A process for the preparation of the optical antipode of vincamine, which comprises the steps of:
   a. oxidizing (+)-vincadifformine with a peracid under nitrogen, in the absence of light and in the presence of a water-immiscible solvent selected from the group consisting of aromatic solvents, aliphatic chlorinated hydrocarbons and ether for a time at least sufficient for producing (+)-1,2-dehydro-16-carbomethoxy-16-hydroxy-N-oxyaspidospermidine; and b. reducing the (+)-1,2-dehydro-16-carbomethoxy-16-hydroxy-N-oxyaspidospermidine of step (a) in the presence of a liquid low molecular weight organic acid with triphenylphosphine for a time at least sufficient for forming a product comprising a mixture of the optical antipodes of:
  1. vicamine,
  2. 16-epi-vicamine, and
  3. apo-vincamine.

2. The process of claim 1 which comprising oxidizing (+) vincadifformine with an equal molar quantity of a peracid for a time at least sufficient to produce (+)-N-oxy-vincadifformine and then treating the (+)-N-oxy-vincadifformine with an equal molar quantity of a peracid for a time at least sufficient to produce the (+)-1,2-dehydro-16-carbomethoxy-16-hydroxy-N-oxyaspidospermidine.

3. The process of claim 2 which comprises treating the (+)-N-oxy-vincadifformine with an equimolar quantity of a peracid for 1 to 5 days.

4. The process of claim 1 which further comprises isolating the optical antipode of vincamine from the mixture by crystallization from a member selected from the group of acetone, methanol, ethanol and propanol.

5. The process of claim 4 wherein the products of step (b) are separated into fractions by a plurality of successive crystallizations.

6. The process of claim 1 which further comprises isolating the optical antipode of vincamine from the mixture by chromatography with aluminum-oxide and then crystallization from acetone.

7. The process of claim 6 wherein the product mixture of step (b) is separated by chromatography into two fractions wherein the more polar fraction consisting essentially to a major extent of said antipode of vincamine and to a minor extent of the optical antipode of 16-epi-vincamine and the less polar fraction consisting essentially of the optical antipode of apo-vincamine, and wherein the constituents of the more polar fraction are separated by crystallization.

8. The process of claim 1 which comprises reducing the (+)-1,2-dehydro-16-carbomethoxy-16-hydroxy-N-oxyaspidospermidine with an approximately equimolar quantity of the reducing agent in solution in a liquid organic acid of low molecular weight at an elevated temperature for 1 to 2 hours under nitrogen.

9. The process of claim 1 which comprises oxidizing (+)-vincadifformine with about two molar equivalents of a peroxide for a time at least sufficient to form the (+)-1,2-dehydro-16-carbomethoxy-16-hydroxy-N-oxy-aspidospermidine.

10. The process of claim 1 which comprises oxidizing (+)-vincadifformine with about 2 molar equivalents of a peroxide for 1 to 5 days.

11. A process of claim 1 which comprises oxidizing (+)-vincadifformine for 1 to 5 hours with an equimolar quantity of a peracid at room temperature under nitrogen and in the absence of light.

12. A process of claim 11 which further comprises washing the reaction solution with aqueous alkaline solution to remove the major part of the peracid and its conversion products, and then distilling the reaction solution to obtain a residue containing (+)-N-oxy-vincadifformine.

13. The process of claim 11 which comprises treating the (+)-N-oxy-vincadifformine with an equimolar quantity of a peracid for 1 to 5 days.

14. The process of claim 1 wherein said liquid low molecular weight organic acid is acetic acid.

15. The process of claim 1 wherein said peracid is selected from the group of peracetic acid, perbenzoic acid, m-chloroperbenzoic acid, p-nitroperbenzoic acid, trifluoro-peracetic acid, performic acid and perphthalic acid.

16. A process for the preparation of the optical antipode of vincamine, which comprises the steps of
  a. oxidizing (+)-vincadifformine with an equal molar quantity of a peracid for about 1 to 5 hours under nitrogen, in the absence of light, and in the presence of a water-immiscible organic solvent selected from the group consisting of aromatic solvents, ethers and chlorinated aliphatic hydrocarbons, to produce (+)-N-oxy-vincadifformine;
  b. washing the reaction solution with aqueous alkaline solution to remove the major part of the peracid and its conversion products;
  c. distilling the reaction solution to obtain a residue containing (+)-N-oxy-vincadifformine;
  d. oxidizing the (+)-N-oxy-vincadifformine with an equal molar quantity of a peracid for between 1 and 5 days under nitrogen, in the absence of light, and in the presence of a water-immiscible organic solvent selected from the group consisting of aromatic solvents, ethers, and chlorinated aliphatic hydrocarbons, to produce (+)-1,2-dehydro-16-carbomethoxy-16-hydroxy-N-oxy-aspidospermidine;
  e. the peracid of steps (a) and (d) being selected from the group of peracetic acid, perbenzoic acid, m-chloro-perbenzoic acid, p-nitroperbenzoic acid, trifluoroperacetic acid, performic acid and perphthalic acid;
  f. reducing the (+)-1,2-dehydro-16-carbomethoxy-16-hydroxy-N-oxyaspidospermidine of step (e) with triphenylphosphine in the presence of acetic acid for a time at least sufficient for forming a product comprising a mixture of the optical antipodes of:
    1. vincamine
    2. 16-epi-vincamine, and
    3. apo-vincamine.

17. The process of claim 16 wherein said aqueous alkaline solution is aqueous sodium bicarbonate solution.

* * * * *

UNITED STATES PATENT OFFICE
CERTIFICATE OF CORRECTION

Patent No. 3,894,028              Dated July 8, 1975

Inventor(s) Jean Levy

It is certified that error appears in the above-identified patent and that said Letters Patent are hereby corrected as shown below:

The term of this patent subsequent to

July 8, 1992, has been disclaimed.

Signed and Sealed this

Sixth Day of July 1976

[SEAL]

Attest:

RUTH C. MASON
*Attesting Officer*

C. MARSHALL DANN
*Commissioner of Patents and Trademarks*